United States Patent
De Soccio

(10) Patent No.: US 11,248,670 B2
(45) Date of Patent: Feb. 15, 2022

(54) PAD FOR DISC BRAKES

(71) Applicant: COFREN S.r.l., Avellino (IT)

(72) Inventor: Vittorio De Soccio, Benevento (IT)

(73) Assignee: COFREN S.R.L., Avellino (IT)

(*) Notice: Subject to any disclaimer, the term of this patent is extended or adjusted under 35 U.S.C. 154(b) by 42 days.

(21) Appl. No.: 16/824,970

(22) Filed: Mar. 20, 2020

(65) Prior Publication Data

US 2020/0332848 A1    Oct. 22, 2020

(30) Foreign Application Priority Data

Apr. 18, 2019    (IT) .................. 102019000006094

(51) Int. Cl.
  *F16D 65/092*    (2006.01)
  *B61H 5/00*    (2006.01)
  *F16D 65/095*    (2006.01)

(52) U.S. Cl.
  CPC ............. *F16D 65/092* (2013.01); *B61H 5/00* (2013.01); *F16D 65/095* (2013.01)

(58) Field of Classification Search
  CPC ........ F16D 65/092; F16D 65/095; B61H 5/00
  See application file for complete search history.

(56) References Cited

U.S. PATENT DOCUMENTS

| | | | | |
|---|---|---|---|---|
| 2,713,923 A * | 7/1955 | Eksergian | ........... | F16D 55/2245 188/251 A |
| 3,297,117 A * | 1/1967 | Freholm | ............. | F16D 69/0408 188/234 |
| 7,648,007 B2 * | 1/2010 | Russo | ................. | F16D 65/0006 188/250 E |
| 8,544,617 B2 * | 10/2013 | De Soccio | .......... | F16D 69/0408 188/235 |
| 9,394,953 B2 * | 7/2016 | Kato | ....................... | F16D 55/22 |
| 9,441,694 B2 * | 9/2016 | Maehara | .................. | B61H 5/00 |
| 10,030,725 B2 * | 7/2018 | Kato | ....................... | B61H 5/00 |
| 10,718,392 B2 * | 7/2020 | Fuderer | .................... | B61H 5/00 |
| 2006/0151267 A1 * | 7/2006 | Russo | .................. | F16D 65/092 188/250 B |
| 2012/0298458 A1 | 11/2012 | Hiramatsu et al. | | |

(Continued)

FOREIGN PATENT DOCUMENTS

| | | |
|---|---|---|
| CN | 104912968 A | 9/2015 |
| DE | WO-2016102285 A1 * | 6/2016 |

(Continued)

*Primary Examiner* — Pamela Rodriguez
(74) *Attorney, Agent, or Firm* — The Small Patent Law Group LLC; Christopher R. Carroll

(57) ABSTRACT

A pad for disc brakes for railway vehicles is provided. The pad includes a base plate and friction elements fixed to the plate and arranged in at least two arcuate rows. Each row has friction elements with one same friction surface and a total friction surface ranging from 40% to 80% of the total friction surface of the friction elements of a neighboring external row. Each friction element of at least one neighboring internal row has a friction surface that is less than the friction surface of each friction element of the neighboring external row. The friction elements of each row are arranged on the base plate to act on a surface portion of a brake disc, which partially overlaps surface portions of the disc on which friction elements of a neighboring external row and friction elements of a neighboring internal row act.

15 Claims, 2 Drawing Sheets

(56) References Cited

U.S. PATENT DOCUMENTS

2014/0360823 A1\* 12/2014 De Soccio ............... B61H 5/00
                                                    188/250 G
2018/0017123 A1\* 1/2018 Elstorpff ............... F16D 65/092

FOREIGN PATENT DOCUMENTS

| EP | 2085637 A1 | 8/2009 |
|---|---|---|
| WO | 2007012458 A1 | 2/2007 |

\* cited by examiner

PAD FOR DISC BRAKES

CROSS-REFERENCE TO RELATED APPLICATIONS

This Patent Application claims priority from Italian Patent Application No. 102019000006094 filed on Apr. 18, 2019, the entire disclosure of which is incorporated herein by reference.

TECHNICAL FIELD

The present invention relates to a pad for disc brakes for railway vehicles.

BACKGROUND

As is known, disc brakes are subject to elevated stress and in order to obtain an optimum braking action, it is essential to have a good transmission of the braking force from the pad to the disc.

For some time now, the use of pads comprising a plurality of friction elements of reduced sizes, instead of only one larger friction element, has been favoured. One of the solutions, which has been adopted in this respect, involves each pad's being substantially made up of a main base plate and a plurality of friction elements fixed to the base plate. Each of the friction elements is made up of a metal sheet and a friction plug permanently fixed to the metal sheet.

The solution relating to the use of a plurality of friction elements of reduced sizes is advantageous both in terms of the efficiency of the pressure on the disc and, therefore, of braking, and also in terms of low noise. In this regard, it must be stressed how low noise has increasingly become a determining factor in the choice of the disc brakes to be used.

Although the above-described pad solution offers the aforesaid advantages in terms of braking and noise, it has the drawback of causing a circular depression on the disc brake. The presence of such a circular depression necessarily results in the damage of the pad's friction elements. In fact, during operation, there may be a misalignment of the disc with respect to the pad, which, although slight, brings one or more friction elements to impact against a step defined by the circular depression. As may be obvious to an expert in the field, the collision of the friction element against the step may cause damage to the friction element, requiring it to be replaced.

The above inevitably requires that the disc undergo frequent checks to verify whether the maintenance and/or replacement thereof is required, with the obvious consequent drawbacks that this entails in financial terms.

The technical problem, which the present invention aims to solve, is to produce a pad for disc brakes, the technical features of which are such as to avoid the formation of a circular depression on the disc, without thereby compromising the advantages in terms of braking efficiency and low noise, guaranteed by the pad with a plurality of friction elements.

The inventor of the present invention has developed a solution for a pad, wherein the arrangement and sizes of the friction elements guarantee the solution of the drawbacks described above as they result in an effective and correct reduction in the friction surface as a function of the reduction in angular speed of the different pad portions.

DISCLOSURE OF INVENTION

The subject of this invention is a pad for disc brakes for railway vehicles comprising a base plate and a plurality of friction elements fixed to the base plate; said friction elements being arranged in rows, which have an arcuate shape, and, in use, substantially overlap respective concentric lines of a disc upon which the pad acts; each row having friction elements with one same friction surface; said pad comprising at least two rows and each row comprising at least two friction elements; said friction elements of each row having a total friction surface the size of which ranges from 40% to 80% of the total friction surface of friction elements of an immediately following more external row; said pad being characterised in that each of the friction elements of at least one more internal row has a friction surface, which is less than the friction surface of each of the friction elements of an immediately following more external row; said friction elements of each row being arranged on said base plate so as to act on one surface portion of the disc, which partially overlaps surface portions of the disc on which friction elements of a possible immediately following more external row and friction elements of a possible immediately following more internal row act.

Below and hereinafter, a row of friction elements is defined as more external or more internal than another if the position thereof is closer respectively to the external edge De (larger) or to the internal edge Di (smaller) of the disc D upon which the pad acts.

Preferably, each of said elements of each row has a friction surface the size of which ranges from 50% to 70% of the surface of each of the friction elements of an immediately following more external row.

Preferably, the pad, the subject of this invention, comprises three arcuate rows, of which the more external row comprises three friction elements equal to one another, the intermediate row comprises two friction elements equal to each other and the more internal row comprises two friction elements equal to each other.

Preferably, the single friction elements of said more external row are the same size as the single friction elements of said intermediate row.

BRIEF DESCRIPTION OF THE DRAWINGS

For a better understanding of the invention, an embodiment is shown below, which is purely illustrative and non-limiting, with the aid of the figures of the accompanying drawing, wherein.

BEST MODE FOR CARRYING OUT THE INVENTION

Figure 1:
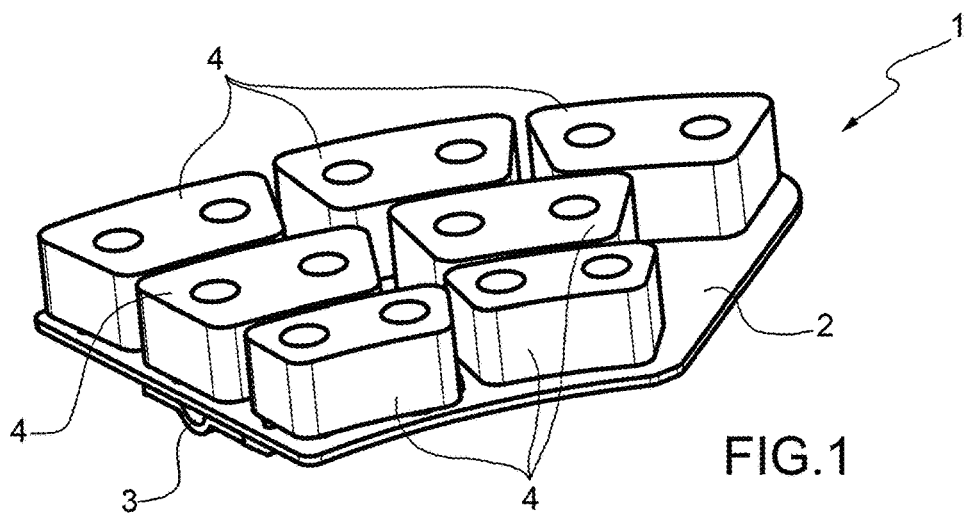
FIG. 1 is a perspective view from above of the pad that is the subject of the present invention.
Figure 3:
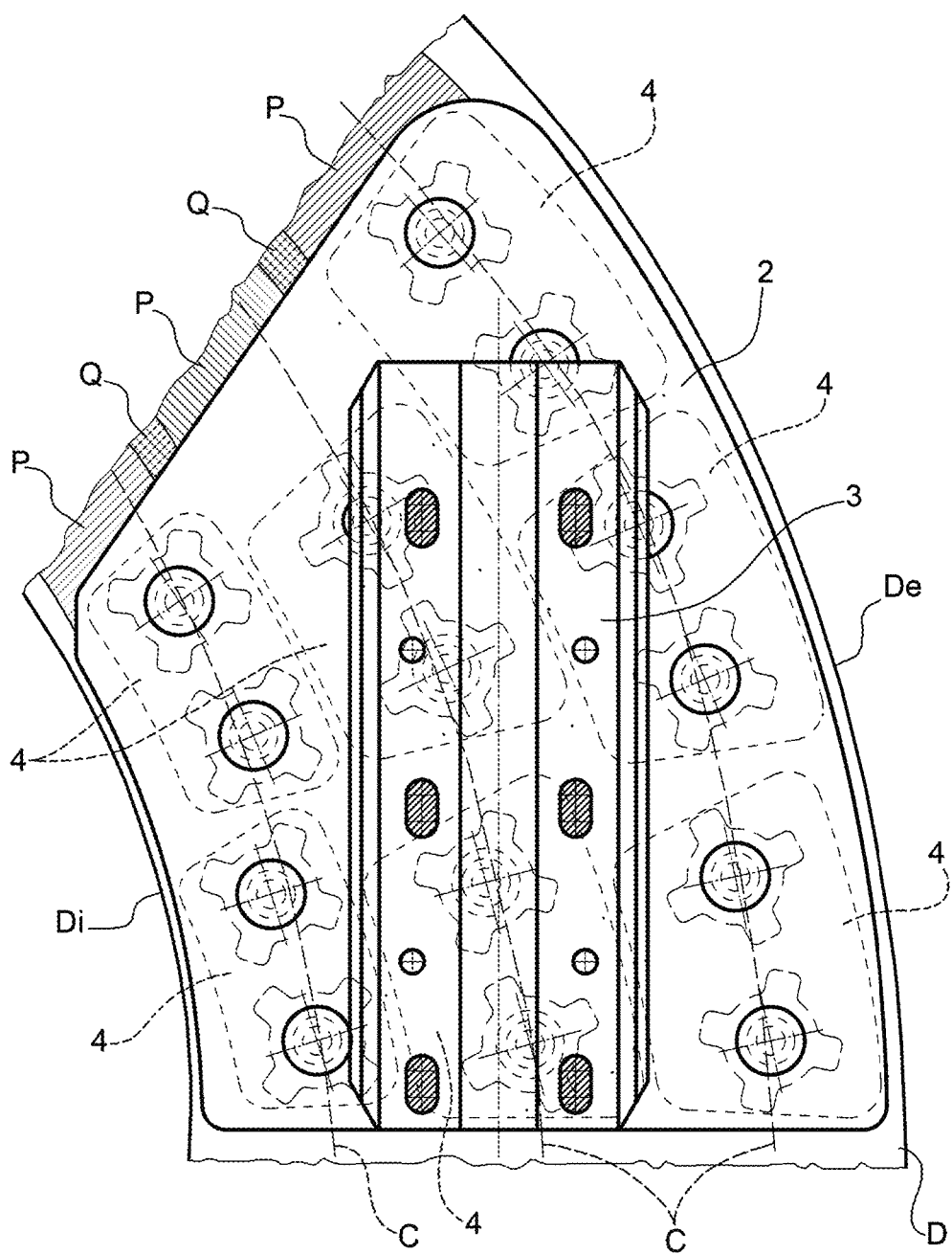
FIG. 3 is a view from below, with parts that are transparent for clarity, of the pad in FIG. 1 applied to a disc.

In FIGS. 1 and 3, the reference number 1 denotes a pad for disc brakes according to this invention.

Figure 2:
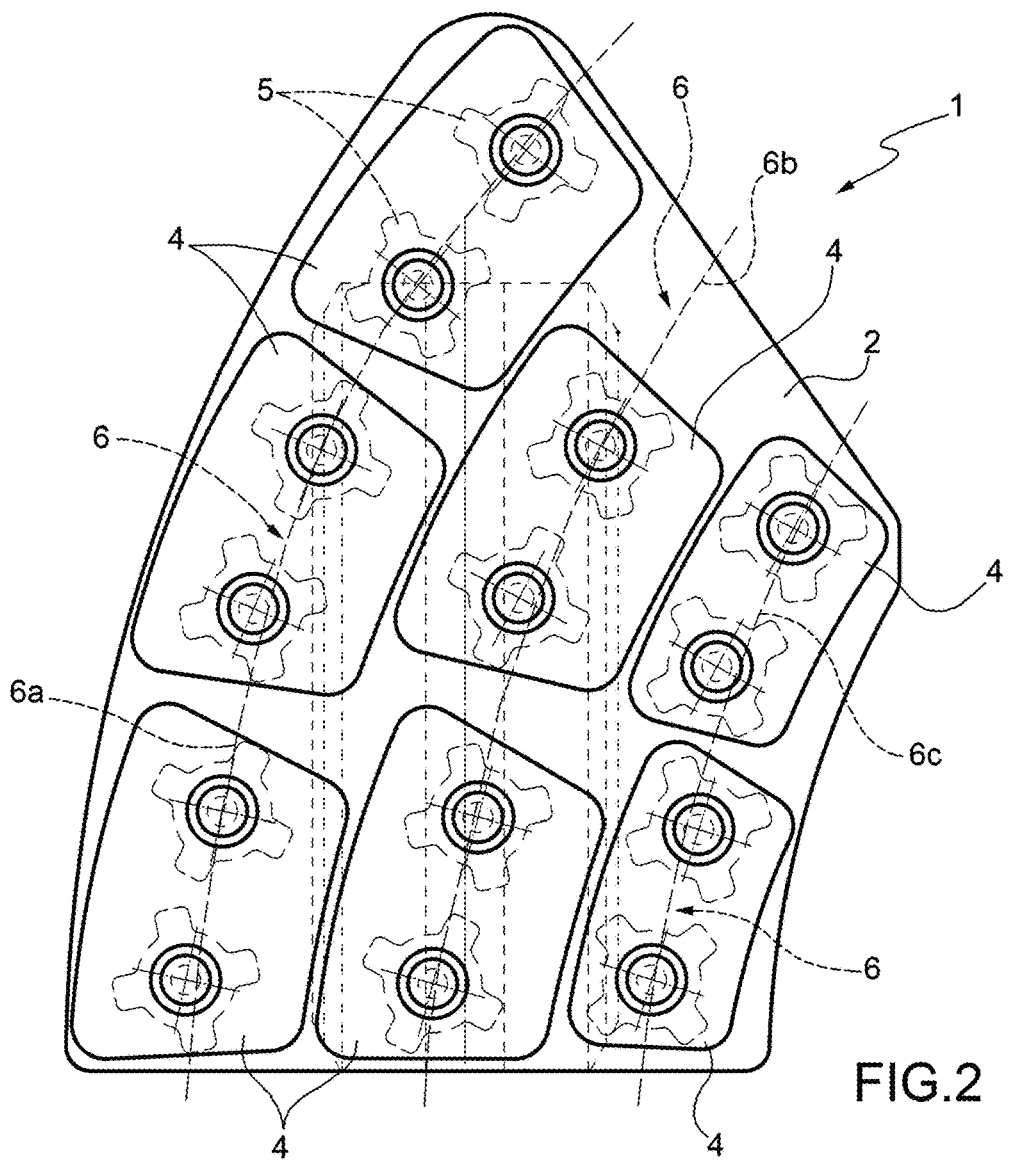
FIG. 2 is a view from above, with parts that are transparent for clarity, of the pad in FIG. 1.

The pad 1 comprises a base plate 2, a "dove-tail" fixing element 3 fixed to a rear surface of the base plate 2 and designed to fix the pad 1 to a structure of the disc brake, a plurality of friction elements 4 fixed to the base plate 2 and arranged so as to exert the pressure on the brake disc to create the braking action, and a plurality of spacers 5 arranged in pairs between a friction element 4 and the base plate 2. The spacers are shown in dashed lines as they are transparently visible. Only two spacers in FIG. 2 are denoted with reference number 5.

For the purposes of this invention, it is irrelevant whether the friction elements 4 are reversibly or irreversibly fixed to the plate 2.

The friction elements 4 are arranged along the arcuate rows, shown in dashed lines, and denoted with 6, which, in use, substantially overlap the concentric lines C of the disc D upon which the pad acts 1. For simplicity, the disc D is shown only partially in FIG. 3 and the concentric lines C are shown in dashed lines in FIG. 3.

In particular, the friction elements 4 are arranged in three rows 6, which can be identified as an external row 6a, an intermediate row 6b, and an internal row 6c.

The external row 6a comprises three friction elements 4 equal to one another, while the intermediate row 6b comprises two friction elements 4 equal to each other and each of which has a friction surface equal to that of each of the elements of the external row 6a.

In contrast, the internal row 6c comprises two friction elements 4 equal to each other and each of which has a friction surface that is less than the surface of each of the elements of the external row 6a or of the intermediate row 6b.

In detail, the total surface of the friction elements 4 of the internal row 6 c is equal to 58% of the total surface of the friction elements 4 of the intermediate row 6 b, while the total surface of the friction elements 4 of the intermediate row 6 b is equal to 66% of the total surface of the friction elements 4 of the external row 6 a.

As shown in FIG. 3, the friction elements 4 of each row 6 act on a portion P of disc D, which overlaps the portions P of disc D upon which the friction elements 4 of the following more external and more internal rows 6 act. The portions are shown in dashed line surfaces in order to clearly show how the portions overlap. In FIG. 3, Q denotes the overlapping portions of two portions P.

It has been experimentally proven that if there are fewer than two rows 6 and/or if there are fewer than two friction elements 4 for each row 6, the pad is not capable of solving the technical problem described above. In fact, to prevent the circular depression from forming, the friction elements should be too big, thus losing the advantages in terms of braking and noise. In particular, the friction elements wouldn't be able to exert effective pressure on the disc and, above all, the friction elements themselves wouldn't be able to be cooled correctly.

It has been experimentally proven that if the friction surface of the various rows of friction elements were to be reduced by varying only the number of friction elements and not the size thereof, the results would not be those desired because a series of drawbacks would be encountered.

In fact, by using friction elements all of the same size in the pad and by reducing the number thereof per row in order to reduce the friction surface going from the more external row to the more internal row, too large a friction surface variation gradient would be created between the rows of the pad. Such a large difference in the friction surface between the rows of friction elements produces an imbalance of the pad portions, which inevitably results in abnormal disc wear.

Furthermore, having smaller friction elements in the more internal row guarantees a great reduction in vibrations in the same friction element, avoiding negative repercussions on the internal part of the disc, which is the most vulnerable part of the disc as it is closest to the hub.

Furthermore, having smaller friction elements in the more internal row guarantees a greater geometric adaptability of the same friction elements on the pad base plate. In this way, the present invention adapts to base plates, which are already in production, and without having to produce new ones.

It has been experimentally proven that a ratio between the friction surfaces, which is different from the one claimed, doesn't produce an effective braking action and would result in a detrimental imbalance between the pad portions.

The invention claimed is:

1. A pad for disc brakes, the pad comprising:
a base plate; and
a plurality of friction elements fixed to the base plate, the plurality of friction elements arranged in at least an internal row, an external row, and an intermediate row between the internal row and the external row, the internal row, the external row, and the intermediate row having arcuate shapes and that substantially overlap respective concentric lines of a disc upon which the pad acts, each of the internal row, the external row, and the intermediate row having at least two friction elements of the plurality of friction elements,
wherein each of the friction elements in the intermediate row has an equivalently sized individual friction surface,
wherein the friction elements in the internal row each have a first individual friction surface that is a same first size as the first individual friction surface of each other of the friction elements in the internal row, the friction elements in the intermediate row each have a second individual friction surface that is a same second size as the second individual friction surface of each other of the friction elements in the intermediate row.

2. The pad according to claim 1, wherein each of the at least two friction elements in the intermediate row has the individual friction surface with a first size in a range from 50% to 70% of the individual friction surface of each of the at least two friction elements in the external row and each of the at least two friction elements in the internal row has the individual friction surface with a second size in the range from 50% to 70% of the individual friction surface of each of the at least two friction elements in the intermediate row.

3. The pad according to claim 1, wherein the first size of the first individual friction surface of each of the friction elements in the internal row is smaller than the second size of the second individual friction surface of each of the friction elements in the intermediate row.

4. The pad according to claim 1, wherein the friction elements in the external row each have a first individual friction surface that is a same first size as the first individual friction surface of each other of the friction elements in the external row, the friction elements in the intermediate row each have a second individual friction surface that is a same second size as the second individual friction surface of each other of the friction elements in the intermediate row.

5. The pad according to claim 4, wherein the first size of the first individual friction surface of each of the friction elements in the external row and the second size of the second individual friction surface of each of the friction elements in the intermediate row are equivalently sized.

6. The pad according to claim 1, wherein the at least two friction elements of each of the at least two rows are arranged on the base plate to act on a surface portion of the disc that partially overlaps surface portions of the disc on which the friction elements of the external row and the friction elements of the internal row act.

7. A disc brake pad comprising:
a base plate; and
friction elements coupled with the base plate and each having a friction surface, the friction elements arranged in plural rows on the base plate, wherein the friction surface of each of the friction elements in at least two of the rows are a same first size,
wherein the friction elements are arranged in at least three of the rows including an internal row, an external row, and an intermediate row between the internal row and the external row, the friction surface of each of the friction elements in the intermediate row being the same first size, wherein the friction surface of each of the friction elements in the internal row is a smaller second size than the first size of the friction surface of each of the friction elements in the intermediate row and in the external row.

8. The disc brake pad of claim 7, wherein the friction surface of each of the friction elements in the intermediate row and the external row being the same first size.

9. The disc brake pad of claim 7, wherein each of the friction elements is coupled with the base plate by plural spacers.

10. A disc brake pad comprising:
a base plate; and
friction elements coupled with the base plate and each having a friction surface, the friction elements arranged in plural rows on the base plate, wherein the friction surface of each of the friction elements in at least two of the rows are a same first size and the friction surface of each of the friction elements in at least a third row of the rows are a same second size that is different from the first size.

11. The disc brake pad of claim 10, wherein the second size is smaller than the first size.

12. The disc brake pad of claim 10, wherein the rows in the at least two of the rows includes an external row and an intermediate row, the at least the third row includes an internal row that is spaced apart from the external row by the intermediate row.

13. The disc brake pad of claim 12, wherein the friction surface of each of the friction elements in the internal row is smaller than the friction surface of each of the friction elements in the intermediate row and in the external row.

14. The disc brake pad of claim 13, wherein a first total surface area of the friction surfaces of the friction elements in the internal row is no more than 58% of a second total surface area of the friction surfaces of the friction elements in the intermediate row.

15. The disc brake pad of claim 14, wherein the second total surface area of the friction surfaces of the friction elements in the intermediate row is no more than 66% of a third total surface area of the friction surfaces of the friction elements in the external row.

* * * * *